T856,048

BEST AVAILABLE COPY

DEFENSIVE PUBLICATION T856,048

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1021

736,248

POLYFULVENES HAVING A CONTINUOUS NETWORK STRUCTURE AND A MANUFACTURING PROCESS THEREFOR

John F. Feilers, Livonia, Mich., assignor to Ford Motor Company, Dearborn, Mich., a corporation of Delaware

Filed June 12, 1968. Published Nov. 26, 1968
Class 260—93.1
No Drawing. 6 Pages Specification

6,6-dimethylfulvene monomer is irradiated in the absence of water with gamma rays from Cobalt 60 to produce a polyfulvene having a continuous network structure. The polymer has good impact strength, a high glass transition temperature, and is thermosetting, and can be used as a structural material for vehicle body components, as a film forming constituent, or as a fiber. Other lower alkyls can be substituted for the methyl radicals on the number 6 carbon, and minor substitutions also can be made on the ring atoms of the monomer. Irradiation is carried out at a relatively low temperature, usually about 0° C., after the monomer has been carefully purified.